Figure 3:
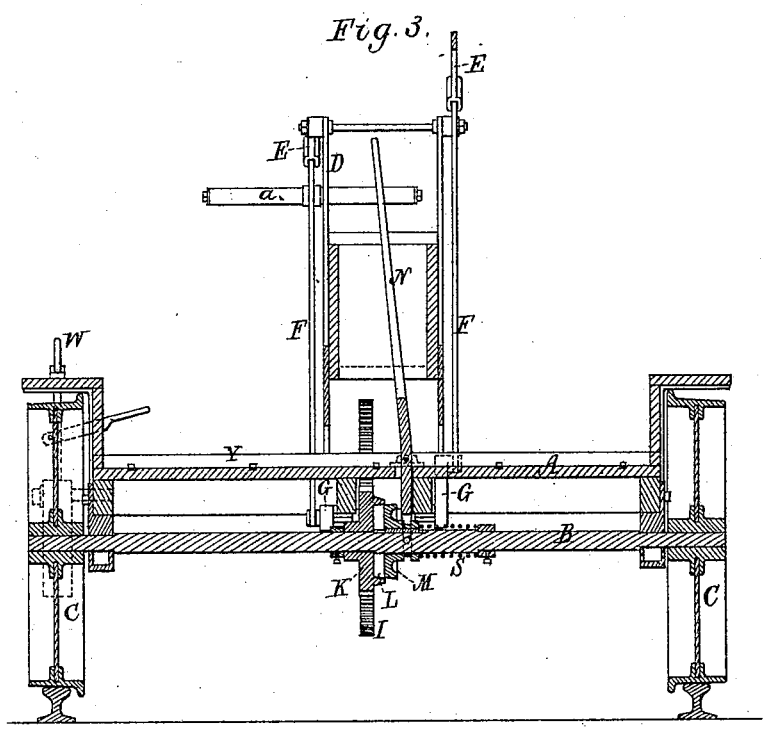

(No Model.) 2 Sheets—Sheet 1.
J. D. BILLINGS.
HAND CAR.
No. 270,375. Patented Jan. 9, 1883.
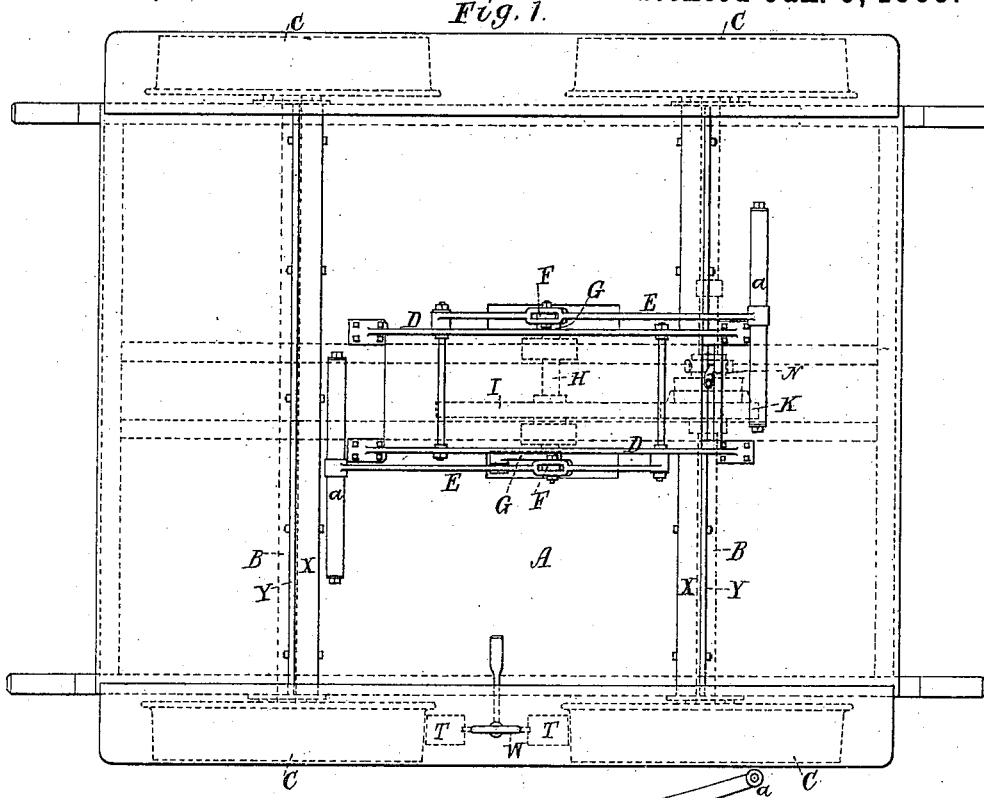
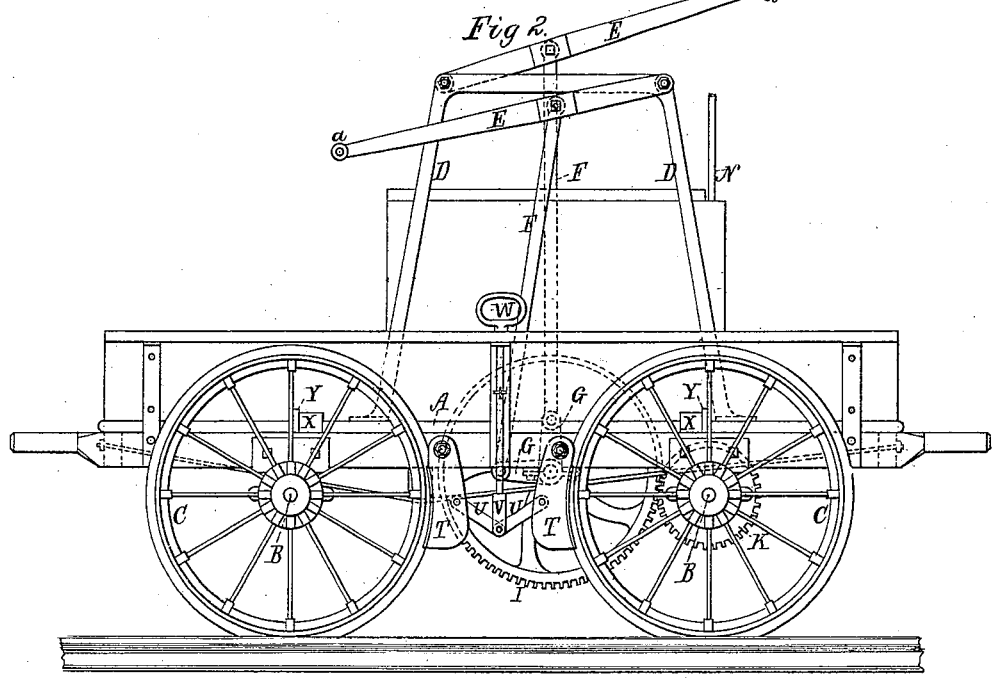
Witnesses.
S. N. Piper.
E. A. Pratt.
Inventor,
Joseph D. Billings.
by R. H. Eddy atty (No Model.)  2 Sheets—Sheet 2.

J. D. BILLINGS.
HAND CAR.

No. 270,375. Patented Jan. 9, 1883.

Witnesses
S. N. Piper
E. D. Pratt

Inventor
Joseph D. Billings
by R. H. Eddy atty.

UNITED STATES PATENT OFFICE.

JOSEPH D. BILLINGS, OF SALEM, MASSACHUSETTS.

HAND-CAR.

SPECIFICATION forming part of Letters Patent No. 270,375, dated January 9, 1883.

Application filed October 30, 1882. (No model.)

*To all whom it may concern:*

Be it known that I, JOSEPH D. BILLINGS, of Salem, in the county of Essex, of the State of Massachusetts, have invented a new and useful Improvement in Hand-Cars for Railways; and I do hereby declare the same to be described in the following specification and represented in the accompanying drawings, in which—

Figure 1 is a top view, and Fig. 2 a side elevation, and Fig. 3 a transverse section, of a hand-car embodying my invention, the nature of which is defined in the claim hereinafter presented.

In such drawings, A denotes the body or platform; B B, the axles, and C C C C the four wheels of a hand-car. On this body or platform there is erected a frame, D, to the upper part of which are fulcrumed two levers, E E, provided with handles or brakes *a a*, as shown. From these levers connecting-rods F F extend downward and are applied to the wrists of two cranks, G G, fixed upon the end of a short shaft, H, arranged transversely underneath the platform, one of such cranks being vertical while the other is horizontal.

Fixed on the shaft H is a spur-gear, I, that engages with another such but smaller gear, K, arranged concentrically upon one of the axles, B, the said axle turning freely within the gear when not clutched thereto.

To the gear K is fixed the female portion L of a friction-clutch, the male portion M of which is applied to slide on the axle toward or away from the female portion, but applied to the axle by a spline or "feather connection," so as to revolve with it, the said male portion being provided with a spring, S, to force it into engagement with the female portion grooved in and around its hub to receive projections from the prongs of a forked lever, N, fulcrumed to the car-body or platform, and arranged as shown.

By taking hold of the upper arm of the lever and moving the lever in the right direction the male portion of the clutch may be forced out of engagement with the female portion, the two portions when in engagement serving to clutch the gear K to the axle in order for such axle to be revolved by the gearing through manual power applied to the two brakes.

By having the two cranks arranged as described, and their operative levers and connection-rods, it will be seen that one crank will be in a favorable position for its shaft to be revolved when the other crank is on the dead-center, and by having the axle to turn freely within the gear K, and such gear and axle provided with the parts of a friction-clutch, as described, the axle can readily be engaged with its driving mechanism or thrown out of engagement therewith, as occasion may require, for when the car may be going down a grade it frequently happens that it will be propelled by the force of gravity alone, in which case the propelling-axle should be free to revolve without revolving its actuating-gears, and thereby putting in motion the mechanism for revolving them. Furthermore, there are between two of the wheels of one side of the car two brakes, T T, which are pivoted to the platform and worked by means of toggles U U, and a lifter, V, arranged as shown, and provided with a handle, W. A pedal fulcrumed to the car-body and pivoted to the lifter enables a person to operate the lifter by his foot in case it may not be convenient to do so by the handle.

Extending across and somewhat above the platform are two rails, X X, having iron plates or guards Y Y bolted to one side of each and projecting a little above it, these devices being to support and keep in place railway bars, ties, or sills when loaded on the platform.

I claim—

The combination of the hand-levers E E, connection-rods F F, cranks G G, their shaft H, two gears, I and K, and the friction-clutch L M, and its operative lever N, arranged and applied to the car-body and one of the axles thereof, substantially and to operate as set forth.

JOSEPH D. BILLINGS.

Witnesses:
 R. H. EDDY,
 S. N. PIPER.